United States Patent
Van Berchum et al.

(10) Patent No.: US 9,309,343 B2
(45) Date of Patent: Apr. 12, 2016

(54) CURABLE COMPOSITIONS AND MEMBRANES

(75) Inventors: Bastiaan Van Berchum, Tilburg (NL); Willem Johannes Van Baak, Tilburg (NL); Jacko Hessing, Tilburg (NL)

(73) Assignee: Fujifilm Manufacturing Europe BV (NL)

( * ) Notice: Subject to any disclaimer, the term of this patent is extended or adjusted under 35 U.S.C. 154(b) by 0 days.

(21) Appl. No.: 14/233,167

(22) PCT Filed: Jul. 5, 2012

(86) PCT No.: PCT/GB2012/051569
§ 371 (c)(1),
(2), (4) Date: Mar. 14, 2014

(87) PCT Pub. No.: WO2013/011273
PCT Pub. Date: Jan. 24, 2013

(65) Prior Publication Data
US 2014/0378561 A1    Dec. 25, 2014

(30) Foreign Application Priority Data
Jul. 19, 2011    (GB) .................................. 1112389.0

(51) Int. Cl.
| | | |
|---|---|---|
| C08F 222/38 | (2006.01) | |
| B01D 67/00 | (2006.01) | |
| B01D 71/40 | (2006.01) | |
| B01D 71/56 | (2006.01) | |
| C08F 20/36 | (2006.01) | |
| C08F 220/34 | (2006.01) | |
| C08F 220/56 | (2006.01) | |
| C08F 220/60 | (2006.01) | |
| C08J 5/22 | (2006.01) | |
| B01J 41/14 | (2006.01) | |
| H01M 8/10 | (2006.01) | |
| B01D 53/22 | (2006.01) | |
| B01D 61/36 | (2006.01) | |
| B01D 61/42 | (2006.01) | |

(52) U.S. Cl.
CPC ........ *C08F 222/385* (2013.01); *B01D 67/0006* (2013.01); *B01D 67/009* (2013.01); *B01D 67/0088* (2013.01); *B01D 71/40* (2013.01); *B01D 71/56* (2013.01); *B01J 41/14* (2013.01); *C08F 20/36* (2013.01); *C08F 220/34* (2013.01); *C08F 220/56* (2013.01); *C08F 220/60* (2013.01); *C08J 5/2231* (2013.01); *H01M 8/1041* (2013.01); *B01D 53/228* (2013.01); *B01D 61/364* (2013.01); *B01D 61/42* (2013.01); *B01D 2323/30* (2013.01); *B01D 2323/345* (2013.01); *C08J 2333/24* (2013.01); *C08J 2333/26* (2013.01); *C08J 2335/00* (2013.01); *H01M 2008/1095* (2013.01); *H01M 2300/0082* (2013.01)

(58) Field of Classification Search
USPC ....................................................... 521/27, 25
See application file for complete search history.

(56) References Cited

U.S. PATENT DOCUMENTS

| | | | |
|---|---|---|---|
| 3,678,098 A | 7/1972 | Lewis et al. | |
| 4,218,554 A | 8/1980 | Foley | |
| 4,231,855 A | 11/1980 | Hodgdon et al. | |
| 4,374,720 A | 2/1983 | MacDonald | |
| 4,444,971 A | 4/1984 | McEntire | |
| 4,587,269 A | 5/1986 | Thomas, Jr. | |
| 2007/0018425 A1 | 1/2007 | Gilmore et al. | |
| 2008/0076026 A1 | 3/2008 | Ryu et al. | |
| 2009/0156699 A1 | 6/2009 | MacDonald et al. | |
| 2011/0245409 A1 | 10/2011 | Hood et al. | |
| 2012/0165420 A1* | 6/2012 | Bhikhi et al. | 521/27 |
| 2012/0172281 A1* | 7/2012 | Scheibel | C11D 1/14 510/493 |
| 2012/0248028 A1 | 10/2012 | Antheunis et al. | |
| 2012/0248029 A1 | 10/2012 | Antheunis et al. | |
| 2012/0248030 A1* | 10/2012 | Antheunis et al. | 210/500.27 |
| 2012/0248032 A1* | 10/2012 | Van Berchum et al. | 210/500.38 |
| 2012/0259027 A1 | 10/2012 | Van Berchum et al. | |

FOREIGN PATENT DOCUMENTS

| | | | |
|---|---|---|---|
| JP | 2005-314646 | | 11/2005 |
| JP | 2007-112722 | | 5/2007 |
| JP | 2007-112722 A | * | 5/2007 |
| WO | 2007/018425 A1 | | 2/2007 |
| WO | 2011/073638 A1 | | 6/2011 |
| WO | WO-2011/073638 A1 | * | 6/2011 |

OTHER PUBLICATIONS

International Preliminary Report on Patentability dated Jan. 21, 2014, issued from corresponding PCT/GB2012/051569.

* cited by examiner

*Primary Examiner* — Peter D Mulcahy
*Assistant Examiner* — Henry Hu
(74) *Attorney, Agent, or Firm* — Banner & Witcoff, Ltd.

(57) ABSTRACT

A membrane obtainable from curing a composition comprising (i) a curable compound comprising at least two acrylic groups and a quaternary ammonium group; (ii) solvent; and optionally (iii) a curable compound having one ethylenically unsaturated group.

18 Claims, No Drawings

CURABLE COMPOSITIONS AND MEMBRANES

RELATED APPLICATION DATA

This application is a National Stage Application under 35 U.S.C. 371 of co-pending PCT application PCT/GB2012/051569 designating the United States and filed Jul. 5, 2012; which claims the benefit of GB application number 1112389.0 and filed Jul. 19, 2011 each of which are hereby incorporated by reference in their entireties.

This invention relates to curable compositions, to their use in the preparation of membranes and to the use of such membranes in ion exchange processes.

Ion exchange membranes are useful in a number of applications, including electrodeionisation (EDI), continuous electrodeionisation (CEDI), electrodialysis (ED), electrodialysis reversal (EDR) and capacitive deionisation used in e.g. flow through capacitors (FTC) for the purification of water, Donnan or diffusion dialysis (DD) for e.g. fluoride removal or the recovery of acids, pervaporation for dehydration of organic solvents, fuel cells, electrolysis (EL) of water or for chlor-alkali production, and reverse electrodialysis (RED) where electricity is generated from two streams differing in salt concentration separated by an ion-permeable membrane.

EDI is a water treatment process wherein ions are removed from aqueous liquids using a membrane and an electrical potential to effect ion transport. It differs from other water purification technologies, such as conventional ion exchange, in that it is does not require the use of chemicals such as acids or caustic soda. EDI can be used to produce ultra pure water.

ED and EDR are electrochemical separation processes that remove ions and other charged species from water and other fluids. ED and EDR use small quantities of electricity to transport these species through membranes composed of ion exchange material to create separate purified and concentrated streams. Ions are transferred through the membranes by means of direct current (DC) voltage and are removed from the feed water as the current drives the ions through the membranes to desalinate the process stream. ED and EDR are suitable techniques for producing drinking water. Ion exchange membranes are also used in Zero Liquid Discharge (ZLD) and Zero Discharge Desalination (ZDD).

A membrane electrode assembly (MEA) appears suitable for a variety of applications such as electrolysis, sensors and especially fuel cells.

One of the important problems in the production of ion exchange membranes is how to provide thin membranes with minimal defects. Desirably the membranes have good permselectivity and low electrical resistance. Additionally the membranes are desired to be strong, while at the same time being flexible. Flexibility is required for membranes which are to be wound into tight circumferential structures. The membranes also need to retain their physical integrity over an extended period of time. Desirably the method used to prepare the membranes does not result in excessive curl. It is also desirable for the membranes to be resistant to the chemicals that they can come into contact with, e.g. resistant to hydrolysis. Low swelling on contact with water can also be useful for membranes intended for use in aqueous environments.

Membrane users require the lowest prices available, which means production processes for the membranes are ideally inexpensive and the membranes should be easily capable of mass production.

The present invention seeks to provide compositions suitable for use in the preparation of membranes, in addition to rapid processes for preparing the membranes and the membranes prepared by the processes.

WO 2010/106356 describes membranes obtained from crosslinking agents having an acrylamide group and a tertiary amino group, e.g. 1,4-diacryloyl piperazine.

WO2011/073638 describes membranes obtained from crosslinking agents having secondary amino groups (e.g. N,N'-methylene bisacrylamide, N,N'-(1,2-dihydroxyethylene)bisacrylamide or N,N'-ethylene bisacrylamide) or tertiary amino groups (e.g. 1,4-bisacryloyl homopiperazine).

According to a first aspect of the present invention there is provided a membrane obtainable from curing a composition comprising:
(i) a curable compound comprising at least two acrylic groups and a quaternary ammonium group, (ii) solvent; and optionally (iii) a curable compound having one ethylenically unsaturated group.

Preferably the molar fraction of curable compounds comprising at least two (meth)acrylic groups, relative to the total number of moles of curable compounds present in the composition, is at least 0.25, more preferably at least 0.35, especially at least 0.45. In this specification (including its claims), the verb "comprise" and its conjugations are used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one." In this specification the molar fraction of curable compounds comprising at least two acrylic groups, relative to the total number of moles of curable compounds present in the composition, is often abbreviated to "MF". MF may be calculated as follows:

$$MF = (M_{poly})/(M_{total})$$

wherein:
$M_{poly}$ is the number of moles of curable compounds comprising at least two acrylic groups present in the composition; and
$M_{total}$ is the total number of moles of curable compounds present in the composition.

For example, a composition comprising 0.3 moles of N,N'-(1,4-phenylenebis(methylene))bis(3-acrylamido-N,N-dimethylpropan-1-aminium) bromide (i.e. 0.3 moles of Mpoly), 0.2 moles of N,N'-methylene bisacrylamide (i.e. a further 0.2 moles of Mpoly) and 1.1 moles of 3-acrylamidopropyl-trimethylammonium chloride (i.e. 1.1 moles of a curable compound which does not comprise at least two acrylic groups) would have an MF of $(0.3+0.2)/(0.3+0.2+1.1)=0.31$.

As examples of acrylic ($H_2C=CHCO-$) groups there may be mentioned acrylate ($H_2C=CHCO_2-$) groups and acrylamide ($H_2C=CHCONH-$) groups.

The at least two acrylic groups may be the identical to each other, different from each other or some may be the same as each other and others different. For example, the at least two acrylic groups may all be acrylate groups and so are identical to each other, or they may all be acrylamide groups, or they may comprise at least one acrylate group and at least one acrylamide group.

Component (i) comprises one or more quaternary ammonium group(s). Such groups comprise a positively charged nitrogen atom and a negatively charged counter ion. In contrast to primary, secondary and tertiary ammonium groups, quaternary ammonium groups remain positively charged throughout the pH range 0 to 14. The positively charged nitrogen atom is not protonated and typically has four covalent bonds to organic groups. The identity of the negatively charged counter ion is not critical, although typically it is chosen to be a halide ion (e.g. Cl⁻ or Br⁻) because these are inexpensive. Examples of quaternary ammonium groups are shown below wherein k is an anion (e.g. Cl⁻ or Br⁻) and the covalent bonds are connected to organic groups:

The curable compound (i) preferably has two, three or four acrylic groups, more preferably two, three or four acrylic groups, especially two acrylic groups.

The curable compounds (i) may be obtained by reacting a crosslinking agent having a primary, secondary or tertiary amino group with an alkylating or arylating agent. For example, a primary, secondary or tertiary amino group may be reacted with an excess of an alkyl halide, an activated aryl halide or an epoxide, typically in the presence of base.

When the composition is free from component (ii) it is possible that component (i) will be the only curable component present in the composition. Under such circumstances MF has a value of 1.

Component (i) may comprise one or more than one curable compound comprising at least two acrylic groups and a quaternary ammonium group.

The molecular weight of the curable compound comprising at least two acrylic groups and a quaternary ammonium group preferably satisfies the equation:

$$MW < (300 + 300n)$$

wherein:
MW is the molecular weight of the said curable compound; and
n has a value of 1, 2, 3 or 4 and is the number of quaternary ammonium groups present in the said curable compound.

More preferably the MW of component (i) is $<(200+200n)$, most preferably $<(150+200n)$, wherein MW and n are as hereinbefore defined. A low MW is preferred because a higher charge density (ion exchange capacity) can then be achieved in the resultant membrane.

Curable compounds satisfying the above equation can provide membranes having particularly good permselectivity and low electrical resistance.

The curable compound comprising at least two acrylic groups and a quaternary ammonium group is preferably a compound of the Formula (1):

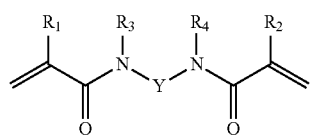

Formula (1)

wherein:
R₁ and R₂ are H;
R₃ and R₄ are each independently H or alkyl, or R₃ and R₄ together with the N atoms to which they are attached and Y form an optionally substituted 6- or 7-membered ring; and Y is a linking group comprising an optionally substituted and optionally interrupted alkylene or arylene group;
provided that the compound of Formula (1) has 1, 2, 3 or 4 quaternary ammonium groups.

When $R_3$ or $R_4$ is alkyl it is preferably $C_{1-4}$-alkyl.

When $R_3$ and $R_4$ together with the N atoms to which they are attached and Y form an optionally substituted 6- or 7-membered ring they preferably form an optionally substituted pyridine, piperazine, homopiperazine or triazine ring, especially such a ring having one or more groups selected from quaternary ammonium groups and salts thereof.

The optional interruptions which may be present in Y are preferably ether and/or amino groups, more preferably quaternary ammonium groups.

When Y comprises an optionally substituted alkylene group this group is preferably of the formula $C_nH_{2n}Q_m$, wherein Q is a quaternary ammonium group, n is 3 to 20 (especially 3 to 12) and m is 1 to 4.

When Y comprises an optionally substituted arylene group this group is preferably a phenylene, pyridylene, pyrimidylene, pyridazyl or pyrizylene group, wherein Y additionally comprises one, two, three or four quaternary ammonium groups and optionally one or more further groups (e.g. $C_{1-4}$-alkyl groups).

The quaternary ammonium group(s) are typically part of the group represented by Y or part of the optionally substituted 6- or 7-membered ring which can be formed from —R₃—N—Y—N—R₄— (wherein Y, R₃ and R₄ are as hereinbefore defined).

In one embodiment component (i) consists of one or more than one (e.g. two to five) compounds of Formula (1).

The curable compounds of Formula (1) may be obtained commercially or by any suitable method, for example by condensing an acryloyl halide at pH>8 with a compound having a quaternary ammonium group and two or more nucleophilic groups, e.g. hydroxy and/or amino groups. Alternatively a compound comprising a tertiary amino group and a acrylic group is reacted with an optionally substituted alkyl dihalide to give a product comprising two acrylic groups and two quaternary ammonium groups. With alkyl trihalides or alkyl tetrahalides compounds with respectively three and four quaternary ammonium groups can be prepared.

Examples of curable compounds of Formula (1) include the following and salts thereof wherein X⁻ is an anionic counterion which is preferably a halide, e.g. Cl⁻ or Br⁻:

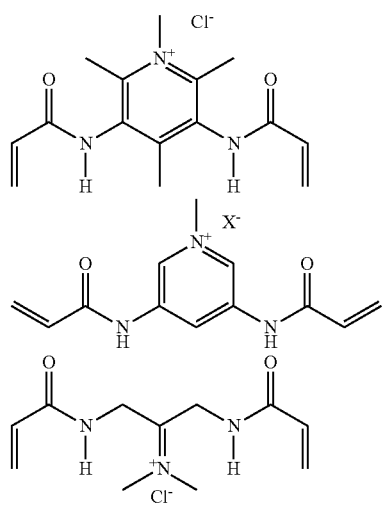

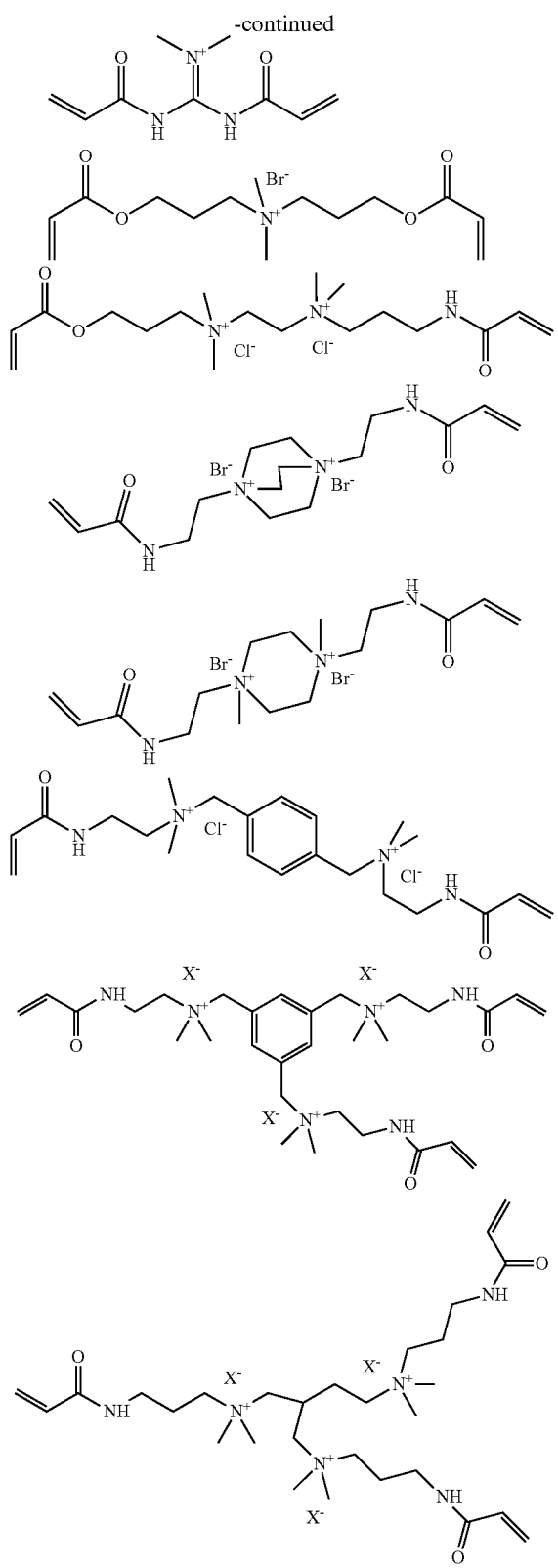

-continued

Preferred examples of compound (i) are N¹,N⁶-bis(3-acrylamidopropyl)-N¹,N¹,N⁶,N⁶-tetramethylhexane-1,6-diaminium bromide, N,N'-(1,4-phenylenebis(methylene))bis(3-acrylamido-N,N-dimethylpropan-1-aminium) bromide, N,N'-(oxybis(ethane-2,1-diyl))bis(3-acrylamido-N,N-dimethylpropan-1-aminium) bromide, N,N'-((ethane-1,2-diylbis(oxy))bis(ethane-2,1-diyl))bis(3-acrylamido-N,N-dimethylpropan-1-aminium)bromide.

Component (i) preferably has a molecular weight below 1500 Dalton, more preferably below 1000 Dalton, especially below 600 Dalton.

The presence of component (i) in the compositions has the advantage over using conventional curable compounds having at least two acrylic groups and lacking quaternary ammonium groups in that component (i) may be used to prepare membranes without diluting the membrane's ionic charge density or ion exchange capacity.

Component (i) is preferably present in the composition in an amount of 2 to 80 wt %, more preferably 4 to 70 wt % and especially 5 to 68 wt %.

When the composition comprises both components (i) and (iii), relatively high ratios of components (i):(iii) can be used to achieve a highly crosslinked, low swelling membrane without adversely affecting the membrane's permselectivity and electrical resistance.

Preferably at least 60 wt %, more preferably at least 75 wt %, especially at least 90 wt %, more especially substantially all of the curable components present in the composition carry a cationic group, especially a quaternary ammonium group.

Component (ii) can lower the viscosity of the composition and make it more suitable for curing in a high-speed, continuous manufacturing process. The solvent (i.e. component (ii)) is not curable and instead acts as a non-reactive diluent for the other components of the composition.

Polar solvents, especially aqueous solvents, are preferred because these are particularly good at dissolving the component (i) and any other components having ionic groups. Preferably at least half of the solvent is water, with the balance comprising organic solvent. The organic solvent can be useful for providing a homogenous solution of all the components of the composition. The inclusion of an organic solvent is also useful for reducing the viscosity and/or surface tension of the composition, making the manufacture of membranes easier in some respects. Preferably the solvent comprises at least 60 wt % water, more preferably at least 80 wt % water.

Preferably the composition comprises 15 to 60 wt %, more preferably 16 to 50 wt %, especially 20 to 45 wt %, more especially 22 to 40 wt %, particularly 25 to 40 wt % or 27 to 40 wt %, of component (ii).

The solvent is preferably water or a mixture comprising water and a water-miscible organic solvent. Due to the presence of a water-miscible organic solvent, water-immiscible solvents may also be tolerated in small amounts such that the overall solvent mixture is miscible.

When the solvent comprises water and an organic solvent the weight ratio of water:organic solvent is preferably between 10:1 and 1:2, more preferably between 4:1 and 1:1 and especially between 3:1 and 2:1.

The organic solvent is optionally a single organic solvent or a combination of two or more organic solvents.

Preferred organic solvents include $C_{1-4}$-alcohols (e.g. methanol, ethanol and propan-2-ol), diols (e.g. ethylene glycol and propylene glycol), triols (e.g. glycerol), carbonates (e.g. ethylene carbonate, propylene carbonate, dimethyl carbonate, diethyl carbonate, di-t-butyl dicarbonate and glycerin carbonate), dimethyl formamide, acetone, N-methyl-2-pyrrolidinone and mixtures comprising two or more thereof. A particularly preferred organic solvent is propan-2-ol.

In one embodiment the organic solvent has a low boiling point e.g. a boiling point below 100° C. Solvents having a low boiling point can be easily removed by evaporation, avoiding the need for a washing step for removal of the solvent.

The optimum solvent content for the curable composition can be determined for each combination by simple experimentation.

Preferably the ethylenically unsaturated group present in component (iii) is a (meth)acrylic group. The term "(meth) acrylic" means "methacrylic or acrylic". Examples of suitable acrylic groups are as discussed above in relation to component (i). As examples of methacrylic ($H_2C=C(CH_3)CO—$) groups there may be mentioned methacrylate ($H_2C=C(CH_3)CO_2—$) groups and methacrylamide ($H_2C=C(CH_3)CONH—$) groups. Acrylic groups are preferred over methacrylic groups because acrylic groups are more reactive. Preferably the ethylenically unsaturated group is a (meth)acrylamide group because this can result in membranes having particularly good resistance to hydrolysis. Most preferred are acrylamide groups.

Preferably the curable compound having one ethylenically unsaturated group comprises a cationic group (e.g. a quaternary ammonium group) because such a group can help the resultant membrane to distinguish between ionic species.

Examples of curable compounds having one ethylenically unsaturated group include (3-acrylamidopropyl)trimethylammonium chloride, 3-methacrylamidopropyl trimethyl ammonium chloride, (ar-vinylbenzyl)trimethylammonium chloride, (2-(methacryloyloxy)ethyl)trimethylammonium chloride, [3-(methacryloylamino)propyl]trimethyl ammonium chloride, (2-acrylamido-2-methylpropyl)trimethylammonium chloride, 3-acrylamido-3-methylbutyl trimethyl ammonium chloride, acryloylamino-2-hydroxypropyl trimethyl ammonium chloride, N-(2-aminoethyl)acrylamide trimethyl ammonium chloride and mixtures comprising two or more thereof.

Component (iii) may comprise more than one compound, e.g. 1 to 5 compounds. For example, component (iii) optionally comprises a curable compound having one ethylenically unsaturated group and a cationic group and a curable compound having one ethylenically unsaturated group which is free from cationic groups.

A particularly preferred component (iii) is 3-acrylamidopropyl trimethylammonium chloride.

Component (iii) can provide the resultant composite membrane with a desirable degree of flexibility, which is particularly useful in applications requiring tightly wound membranes. When component (iii) has a cationic group it also assists the composite membrane in distinguishing between ions of different charges.

For the avoidance of doubt, except where stated otherwise in the specification, wt % figures are relative to the total weight of the composition (e.g. (weight of component/weight of composition)×100%)).

Component (iii) is preferably present in the composition in an amount of 1 to 70 wt %, more preferably 10 to 60 wt %, especially 20 to 50 wt %.

Preferably the molar ratio of component (i) to (iii) (when present) is at least 0.05, more preferably at least 0.15, especially at least 0.2, more especially at least 0.25. The molar ratio of component (i) to (iii) may also be at least 0.5, e.g. at least The total wt % of components (i)+(iii) relative to the total weight of the composition is preferably 30 to 90 wt %, more preferably 40 to 80 wt %, especially 50 to 75 wt %, more especially 58 to 75 wt %, e.g. about 65 wt % or about 68 wt %.

Optionally the composition further comprises a curable compound comprising at least two (meth)acrylic groups and being free from quaternary ammonium groups. In this specification we refer to such compounds as component (iv). Examples of such curable compounds include isophoronediacrylamide, N,N'-(1,2-dihydroxyethylene)bis-acrylamide, N,N-methylene-bis-acrylamide, N,N'-ethylene bis (acrylamide), N,N'-propylenebis(meth)acrylamide, N,N'-butylene bis(meth)acrylamide, bis(aminopropyl) methylamine diacrylamide. Particularly preferred compounds which may be used as component (iv) include tricyclodecanedimethanoldiacrylate, 1,4-diacryoyl piperazine and 1,4-bis(acryloyl)homopiperazine.

Examples of compounds comprising more than two acrylic groups include triacryloyl-tris(2-aminoethyl)amine, triacroyldiethylenetriamine, tetra acryloyltriethylenetetramine, and combinations thereof. Preferably the molecular weight of component (iv) is not high, e.g. lower than 500 Dalton, more preferably lower than 250 Dalton.

The composition preferably comprises 0 to 40 wt % of component (iv), more preferably 0 to 30 wt %. In one embodiment the composition comprises 2 to 30 wt %, more preferably 5 to 20 wt % of component (iv). In another embodiment the composition is free from component (iv). In a further embodiment, the composition comprises up to 50 wt % of component (iv) with the proviso that component (iv) comprises a cationic group and is free from quaternary ammonium groups.

When component (iv) is free from cationic groups it dilutes the amount of charge which is present in the resultant membrane. In one embodiment it is preferred that the composition is free from such compounds (i.e. curable compounds comprising at least two (meth)acrylic groups and being free from cationic groups) or such compounds are present in only small amounts, e.g. in a weight ratio of less than about 50 wt %, more preferably less than 30%, especially less than 20% relative to the weight of component (i). In another embodiment component (iv) may be present in a relatively high amount e.g. a higher wt % than that of component (i) but preferably in this situation a high amount of component (iii) is present wherein component (iii) comprises a cationic group.

Components (i) and (iv) (when present) each comprise at least two acrylic respectively two (meth)acrylic groups and therefore the amount of both are taken into account when determining the value of $M_{poly}$.

Component (iii) is able to react with component (i) (and component (iv) when present) and can provide the resultant membrane with a desirable degree of flexibility, which is particularly useful in applications requiring tightly wound membranes. When component (iii) has an ionic group, as is preferred, this can also help the membrane to distinguish between ions of different charges.

In one embodiment the composition comprises less than 10 wt %, more preferably less than 5 wt %, of ethylenically unsaturated compounds other than components (i) and (iii). In a preferred embodiment the composition is free from ethylenically unsaturated compounds other than components (i) and (iii).

Generally component (i) (and component (iv) when present) provide strength to the membrane, while potentially reducing flexibility.

For making a particularly strong membrane it is preferred that MF is at least 0.30, more preferably at least 0.35.

To achieve the desired degree of flexibility, it is preferred that MF is below 0.95, more preferably below 0.85.

Thus to obtain membranes having a valuable balance of flexibility and strength, the composition preferably has an MF of 0.30 to 0.95, more preferably 0.35 to 0.85.

Preferably the composition has a pH of 0 to 11.

The preferred pH of the composition is 0.2 to 10, more preferably 1 to 9, especially 3 to 8.

Optionally the composition further comprises a non-curable salt. The non-curable salt can be any salt which is not capable of forming a covalent bond with component (i) under the conditions used to cure the composition.

The non-curable salt preferably has a solubility in water at 25° C. of at least 250 g/L, more preferably at least 400 g/L. Preferred non-curable salts are inorganic salts, for example inorganic lithium, sodium, potassium, ammonium, magnesium and calcium salts and mixtures comprising two or more such salts.

Preferred non-curable salts include lithium chloride, lithium bromide, lithium nitrate, lithium iodide, lithium chlorate, lithium thiocyanate, lithium perchlorate, lithium tetrafluoroborate, lithium hexafluorophosphate, lithium hexafluoroarsenate, ammonium thiocyanate, ammonium chloride, ammonium iodide, ammonium nitrate, sodium chloride, sodium bromide, sodium nitrate, sodium thiocyanate, calcium nitrate, calcium thiocyanate, calcium bromide, calcium chloride, calcium perchlorate, calcium iodide, calcium tetrafluoroborate, calcium hexafluorophosphate, calcium hexafluoroarsenate, magnesium chloride, magnesium bromide, magnesium nitrate, magnesium thiocyanate, potassium thiocyanate, potassium chlorate, and mixtures comprising two or more such salts. Most preferred are lithium chloride, lithium bromide, lithium nitrate, ammonium nitrate, sodium nitrate, calcium nitrate and mixtures comprising two or more such salts.

The non-curable salt preferably has a relatively low molecular weight (e.g. below 200, more preferably below 150, especially below 90, more especially below 70. Any waters of crystallisation, when present, are not taken into account when calculating the molecular weight of the non-curable salt.

If the composition does not comprise curable compounds being free from quaternary ammonium groups there is generally no need to add non-curable salts. However if the composition comprises poorly soluble compounds comprising (meth)acrylic groups it may be beneficial to add non-curable salts. In the latter case preferably the ratio of the number of moles of cations being part of the non-curable salt to the total number of moles of (meth)acrylic groups in the composition is 0.3 to 1.1, more preferably 0.4 to 1.05, especially 0.7 to 1.02, e.g. about 0.9.

In one embodiment the composition is free from radical initiators. In another embodiment the composition comprises a radical initiator, for example a photoinitiator.

When the composition contains 0% radical initiator it may be cured using electron beam radiation.

Preferably, however, the composition comprises 0.01 to 10 wt %, more preferably 0.05 to 5 wt %, especially 0.1 to 2 wt % radical initiator. The preferred radical initiator is a photoinitiator.

The radical initiator is often referred to as component (v) in this specification.

The curable composition may comprise one or more than one radical initiator as component.

When the composition comprises an acrylamide, diacrylamide, or higher-acrylamide, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenyl propan-1-one and 2-hydroxy-2-methyl-1-(4-tert-butyl-)phenylpropan-1-one, and acylphosphine oxides, e.g. 2,4,6-trimethylbenzoyl-diphenylphosphine oxide, and bis(2,4,6-trimethylbenzoyl)-phenylphosphine oxide.

When a radical initiator is present in the composition, preferably a polymerization inhibitor is also included (e.g. in an amount of below 2 wt %). This is useful to prevent premature curing of the composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine)aluminum salt, Omnistab™ IN 510, Genorad™ polymerisation inhibitors and mixtures comprising two or more of the foregoing.

The curable composition may contain other components, for example acids, pH controllers, preservatives, viscosity modifiers, stabilisers, dispersing agents, antifoam agents, organic/inorganic salts, anionic, cationic, non-ionic and/or amphoteric surfactants and the like.

The curable composition may of course contain further components not specifically mentioned or excluded above.

Curing rates may be increased by including an amine synergist in the curable composition. Suitable amine synergists are, for example, free alkyl amines, e.g. triethylamine or triethanol amine; aromatic amines, e.g. 2-ethylhexyl-4-dimethylaminobenzoate, ethyl-4-dimethylaminobenzoate and also polymeric amines as polyallylamine and its derivatives.

Curable amine synergists such as ethylenically unsaturated amines (e.g. acrylated amines) are preferable since their use will give less odour due to their ability to be incorporated into the membrane by curing.

When used the amount of amine synergists is preferably from 0.1 to 10 wt. % based on the total weight of polymerisable components in the composition, more preferably from 0.3 to 3 wt %.

In view of the foregoing, the composition preferably comprises:
(i) 2 to 80 wt % of a curable compound comprising at least two acrylic groups and a quaternary ammonium group;
(ii) 15 to 70 wt % of solvent;
(iii) 1 to 70 wt % of curable compound having one ethylenically unsaturated group;
(iv) 0 to 40 wt % of a curable compound comprising at least two (meth)acrylic groups and being free from quaternary ammonium groups; and
(v) 0 to 10 wt % of radical initiator.

Preferably this composition has an MF of at least 0.25.

In another embodiment the composition comprises:
(i) 5 to 80 wt % of a curable compound comprising at least two acrylic groups and a quaternary ammonium group;
(ii) 20 to 45 wt % of solvent
(iii) 0 to 60 wt % of curable compound having one ethylenically unsaturated group;
(iv) 0 to 30 wt % of a curable compound comprising at least two (meth)acrylic groups and being free from quaternary ammonium groups; and
(v) 0.1 to 10 wt % of radical initiator.

Preferably this composition has an MF of at least 0.25.

In a particularly preferred embodiment the composition comprises:
(i) 4 to 70 wt % of curable compound comprising at least two acrylic groups and a quaternary ammonium group;
(ii) 25 to 45 wt % of solvent comprising water or a mixture comprising water and a water-miscible organic solvent
(iii) 10 to 60 wt % of curable compound having one ethylenically unsaturated group;

(iv) 0 to 30 wt % of curable compound comprising at least two (meth)acrylic groups and being free from quaternary ammonium groups; and
(v) 0.1 to 10 wt % of radical initiator.

Preferably this composition has an MF of at least 0.35.

In the compositions described above the amount of component (ii) is preferably 25 to 40 wt %, more preferably 27 to 40 wt %. Preferably the at least two acrylic groups of compound (i) are acrylamide groups.

The aforementioned compositions form a further feature of the present invention.

Preferably the composition is free from, or substantially free from, methacrylic compounds (e.g. methacrylate and methacrylamide compounds), i.e. the composition comprises at most 10 wt % of compounds comprising one or more methacrylic groups.

Preferably the composition is free from, or substantially free from, divinyl benzene and derivatives thereof.

Preferably the composition is free from, or substantially free from, styrene and derivatives thereof.

Preferably the composition is free from, or substantially free from, dyes and pigments. This is because there is no need to include dyes or pigments in the composition.

Thus the preferred composition is free from, or substantially free from, divinyl benzene, dyes, pigments, styrene and methacrylic compounds.

The presence of a compound of Formula (1) in the composition provides membranes comprising the following structural unit of Formula (1'):

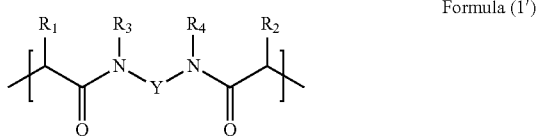

Formula (1')

wherein $R_1$, $R_2$, $R_3$, $R_4$ and Y are as hereinbefore defined and provided that the structural unit of Formula (1') has 1, 2, 3 or 4 quaternary ammonium groups.

Membranes comprising the above structural unit form a further feature of the present invention. The concentration of such units in the membrane will depend on the concentration of the compound of Formula (1) used to make the membrane relative to the amount of any other curable components in the aforementioned composition. Such membranes preferably further comprise structural units obtained from curing component (iii).

According to a second aspect of the present invention there is provided a process for preparing a membrane comprising the following steps:
 a) applying a composition to a support; and
 b) curing the composition to form a membrane;
wherein the composition is the composition defined in the first aspect of the present invention.

Hitherto membranes have often been made in slow and energy intensive processes, often having many stages. The present invention enables the manufacture of membranes in a simple process that may be run continuously for long periods of time to mass produce membranes relatively cheaply.

Optionally the process comprises the further step of separating the cured composition and support. However if desired this further step may be omitted and thereby a composite membrane is produced comprising the cured composition and a porous support.

The thickness of the membrane, including the support, when present, is preferably less than 250 µm, more preferably between 10 and 200 µm, most preferably between 20 and 150 µm.

Preferably the membrane has a calculated ion exchange capacity ("IEC") of at least 0.1 meq/g, more preferably of at least 0.3 meq/g, especially more than 0.6 meq/g, more especially more than 1.0 meq/g, particularly more than 3.0 meq/g of total dry weight of the composition. IEC's towards the upper end of these ranges are preferred in order to reduce the electrical resistance of the resultant membrane. The resultant IEC is expressed as milli-equivalents per gram of dry (i.e. solvent-free) composition (meq/g). Any solvents present in the composition, including any non-curable diluents or waters of crystallisation present in any ingredient used to make the composition, are therefore excluded from the calculation of IEC.

Preferably the membrane has a high calculated crosslink density ("CD") in order to improve the strength and robustness of the resultant membrane. By including component (i) in the composition a high IEC in combination with a high CD can be achieved.

The CD in mmol/g may be calculated for a composition comprising n different curable compounds as follows:

$$CD = \Sigma_{i=1}^{n}((x_i-1) \cdot M_i/MW_i)/M_{total}$$

wherein:
 $M_i$ is the amount of compound i having $x_i$ curable groups in grams;
 $MW_i$ is the molecular weight of compound i in g per mmol; and
 $M_{total}$ is the total amount of curable compounds in grams.

The above determinations are performed in the absence of any support for the membrane. Any solvents present in the composition, including any non-curable diluents or waters of crystallisation present in any ingredient used to make the composition, are therefore excluded from the calculation of CD. For example, a composition comprising 100.3 g of N,N'-(1,4-phenylenebis(methylene))bis(3-acrylamido-N,N-dimethylpropan-1-aminium) bromide (having an MW of 576.41 and n=2), 22.3 g of N,N'-methylene bisacrylamide (having an MW of 154.17 and n=2) and 42.8 g of 3-acrylamidopropyl-trimethylammonium chloride (having an MW of 206.50 and n=1) would have a CD of (100.3/0.57641)/165.4+(22.3/0.15417)/165.4=1.93 mmol/g.

Preferably the CD is at least 0.8 mmol/g, more preferably at least 1.0 mmol/g, especially at least 1.2 mmol/g.

Preferably the membrane has a permselectivity for small anions (e.g. Cl⁻) of more than 80%, more preferably more than 85%, especially more than 90% and more especially more than 93%.

Preferably the membrane has an electrical resistance less than 5 ohm·cm², more preferably less than 3 ohm·cm², especially less than 1.5 ohm/cm². The electrical resistance may be determined by the method described below in the examples section.

Preferably the membrane exhibits a % weight loss when ultrasonicated for 99 minutes and broken-off parts of the membrane are removed of less than 3%, more preferably less than 1%, especially less than 0.5%. The % weight loss can be controlled by, for example, selecting appropriate amounts of components (i), (iii) and (iv) and by adjusting appropriate parameters in the curing step.

Electrical resistance and permselectivity may be measured by the methods described by Djugolecki et al, J. of Membrane Science, 319 (2008) on pages 217-218.

Typically the ion exchange membrane is substantially non-porous e.g. the pores are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 5 nm, preferably smaller than 2 nm.

The resultant membrane preferably has a low water permeability so that ions may pass through the membrane and water molecules do not pass through the membrane. Preferably the membrane's water permeability is lower than $1\times10^{-7}$ $m^3/m^2 \cdot s \cdot kPa$, more preferably lower than $1\times10^{-8}$ $m^3/m^2 \cdot s \cdot kPa$, most preferably lower than $1\times10^{-9}$ $m^3/m^2 \cdot s \cdot kPa$, especially lower than $1\times10^{-10}$ $m^3/m^2 \cdot s \cdot kPa$. The requirements for water permeability depend on the intended use of the membrane.

Where desired, a surfactant or combination of surfactants may be included in the composition as a wetting agent or to adjust surface tension. Commercially available surfactants may be utilized, including radiation-curable surfactants. Surfactants suitable for use in the composition include non-ionic surfactants, ionic surfactants, amphoteric surfactants and combinations thereof.

Preferred surfactants are as described in WO 2007/018425, page 20, line 15 to page 22, line 6, which are incorporated herein by reference thereto. Fluorosurfactants are particularly preferred, especially Zonyl® FSN (produced by E.I. Du Pont).

Preferably the components of the composition are selected such that no phase separation occurs during the curing step. In this way, the likelihood of a porous structure in the resultant membrane is reduced.

The network structure of the membrane is determined to a large extent by the identity of the crosslinking agent(s) and the curable compound and their functionality, e.g. the number of crosslinkable groups they contain per molecule.

During application of the composition to a support, the composition may form a layer on top of the support, or it may permeate wholly or partially into the pores of the support thereby forming an impregnated composite membrane after curing. The composition may also be applied to both sides of the support to achieve a symmetrical composite membrane. In a preferred embodiment the support is saturated with the composition and the saturated support is cured by EB or UV irradiation.

The process of the present invention may contain further steps if desired, for example washing and/or drying the resultant membrane.

Before applying the composition to the surface of the support, the support may be subjected to a corona discharge treatment, plasma glow discharge treatment, flame treatment, ultraviolet light irradiation treatment, chemical treatment or the like, e.g. for the purpose of improving its wettability and the adhesiveness.

The support may also be treated to modify its surface energy, e.g. to values above 70 mN/m.

While it is possible to prepare the membrane on a batch basis using a stationary support, to gain full advantage of the invention it is much preferred to prepare the membrane on a continuous basis using a moving support. The support may be in the form of a roll which is unwound continuously or the support may rest on a continuously driven belt (or a combination of these methods). Using such techniques the composition can be applied to the support on a continuous basis or it can be applied on a large batch basis.

The composition may be applied to the support by any suitable method, for example by curtain coating, blade coating, air-knife coating, knife-over-roll coating, slide coating, nip roll coating, forward roll coating, reverse roll coating, micro-roll coating, dip coating, foulard coating, kiss coating, rod bar coating or spray coating. The coating of multiple layers can be done simultaneously or consecutively. For simultaneous coating of multiple layers, curtain coating, slide coating and slot die coating are preferred. The composition may be applied to one side of the support or to both sides of the support.

In one embodiment at least two of the compositions are applied to the support, e.g. simultaneously or consecutively. The compositions may be applied to the same side of the support or to different sides. Thus the application step may be performed more than once, either with or without curing being performed between each application. When applied to different sides the resultant composite membrane may be symmetrical or asymmetrical and the layers of the composition may have the same or different thicknesses. When applied to the same side a composite membrane may be formed comprising at least one top layer and at least one bottom layer that is closer to the support than the top layer. In this embodiment the top layer and bottom layer, together with any intervening layers, constitute the membrane and the porous support provides strength to the resultant composite membrane.

Thus in a preferred process, the composition is applied continuously to a moving support, more preferably by means of a manufacturing unit comprising one or more composition application station(s), one or more irradiation source(s) for curing the composition, a membrane collecting station and a means for moving the support from the composition application station(s) to the irradiation source(s) and to the membrane collecting station.

The composition application station(s) may be located at an upstream position relative to the irradiation source(s) and the irradiation source(s) is/are located at an upstream position relative to the membrane collecting station.

In order to produce a sufficiently flowable composition for application by a high speed coating machine, it is preferred that the composition has a viscosity below 5000 mPa·s when measured at 35° C., more preferably from 1 to 1500 mPa·s when measured at 35° C. Most preferably the viscosity of the composition is from 2 to 500 mPa·s when measured at 35° C. For coating methods such as slide bead coating the preferred viscosity is from 2 to 150 mPa·s when measured at 35° C.

With suitable coating techniques, the composition may be applied to a support moving at a speed of over 5 m/min, preferably over 10 m/min, more preferably over 15 m/min, e.g. more than 20 m/min, or even higher speeds, such as 60 m/min, 120 m/min or up to 400 m/min can be reached.

Curing is preferably performed by radical polymerisation, preferably using electromagnetic radiation. The source of radiation may be any source which provides the wavelength and intensity of radiation necessary to cure the composition. A typical example of a UV light source for curing is a D-bulb with an output of 600 Watts/inch (240 W/cm) as supplied by Fusion UV Systems. Alternatives are the V-bulb and the H-bulb from the same supplier.

When no photoinitiator is included in the composition, the composition can be cured by electron-beam exposure, e.g. using an exposure of 50 to 300 keV. Curing can also be achieved by plasma or corona exposure.

During curing the components (i) and (iii) (when present) and (iv) (when present) polymerise to form a polymeric membrane. The curing may be brought about by any suitable means, e.g. by irradiation and/or heating. Preferably curing occurs sufficiently rapidly to form a membrane within 30 seconds. If desired further curing may be applied subsequently to finish off, although generally this is not necessary.

The curing is preferably achieved thermally (e.g. by irradiating with infrared light) or, more preferably, by irradiating the composition with ultraviolet light or an electron beam.

For thermal curing the composition preferably comprises one or more thermally reactive free radical initiators, preferably being present in an amount of 0.01 to 5 parts per 100 parts of curable composition, wherein all parts are by weight.

Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. $\alpha,\alpha'$-azobisisobutyronitrile and/or $\gamma,\gamma'$-azobis($\gamma$-cyanovaleric acid); persulfates; peracetates, e.g. methyl peracetate and/or tert-butyl peracetate; peroxalates, e.g. dimethyl peroxalate and/or di(tert-butyl) peroxalate; disulfides, e.g. dimethyl thiuramdisulfide and ketone peroxides, e.g. methyl ethyl ketone peroxide.

Temperatures in the range of from about 30° C. to about 150° C. are generally employed for infrared curing. More often, temperatures in the range of from about 40° C. to about 110° C. are used.

Preferably curing of the composition begins within 3 minutes, more preferably within 60 seconds, after the composition has been applied to the support.

Preferably the curing is achieved by irradiating the composition for less than 30 seconds, more preferably less than 10 seconds, especially less than 3 seconds, more especially less than 2 seconds. In a continuous process the irradiation occurs continuously and the speed at which the composition moves through the beam of irradiation is mainly what determines the time period of curing Preferably the curing uses ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photo-initiator included in the curable composition.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the membrane. Preferably the exposure dose is at least 40 $mJ/cm^2$, more preferably between 40 and 1500 $mJ/cm^2$, most preferably between 70 and 900 $mJ/cm^2$ as measured by an High Energy UV Radiometer (UV PowerMap™ from EIT, Inc) in the UV-A and UV-B range indicated by the apparatus. Exposure times can be chosen freely but preferably are short and are typically less than 10 seconds, more preferably less than 5 seconds, especially less than 3 seconds, more especially less than 2 seconds, e.g. between 0.1 and 1 second.

To reach the desired exposure dose at high coating speeds, more than one UV lamp may be used, so that the composition is irradiated more than once. When two or more lamps are used, all lamps may give an equal dose or each lamp may have an individual setting. For instance the first lamp may give a higher dose than the second and following lamps or the exposure intensity of the first lamp may be lower. Varying the exposure dose of each lamp may influence the polymer matrix structure and the final crosslink density. In a preferred embodiment the composition is cured by simultaneous irradiation from opposite sides using two or more irradiation sources, e.g. two lamps (one at each side). The two or more irradiation sources preferably irradiate the composition with the same intensity as each other. By using this symmetric configuration, a higher crosslinking efficiency can be achieved and curling of the membrane can be reduced or prevented.

Photoinitiators may be included in the composition, as mentioned above, and are usually required when curing uses UV or visible light radiation. Suitable photoinitiators are those known in the art.

Curing is preferably performed at between 20 and 60° C. While higher temperatures may be used, these are not preferred because they can lead to higher manufacturing costs.

Preferred supports are porous, e.g. they may be a woven or non-woven synthetic fabric, e.g. polyethylene, polypropylene, polyacrylonitrile, polyvinyl chloride, polyester, polyamide, and copolymers thereof, or porous membranes based on e.g. polysulfone, polyethersulfone, polyphenylenesulfone, polyphenylenesulfide, polyimide, polyetherimide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene, polychlorotrifluoroethylene, and copolymers thereof.

Commercially available porous supports are available from a number of sources, e.g. from Freudenberg Filtration Technologies (Novatexx materials) and Sefar AG.

The present process allows the preparation of membranes having a desirable degree of flexibility, without being overly flexible or too rigid. The compositions can provide thin membranes with low numbers of defects, low tendency to curl while retaining good durability in use.

According to a third aspect of the present invention there is provided a membrane obtained by a process according to the second aspect of the present invention.

The membranes according to the third aspect of the present invention may also be put to other uses requiring membranes having cationic groups.

The membranes according to the third aspect of the present invention preferably have the properties described above in relation to the second aspect of the present invention.

According to a fourth aspect of the present invention there is provided use of a membrane according to the first or third aspect of the present invention for the separation or purification of liquids, vapours or gases.

The membranes of the invention are particularly useful for water purification, the generation of electricity etc. for example in ED, (C)EDI, EDR, FTC, ZLD, ZDD or RED, although they may also be used for other purposes.

According to a fourth aspect of the present invention there is provided an electrodialysis or reverse electrodialysis unit, a flow through capacitor device, an electrodeionization module, a continuous electrodeionization module, a fuel cell, a diffusion dialysis apparatus, a membrane distillation module or a membrane electrode assembly comprising one or more polymeric membranes according to the present invention.

Preferably the electrodialysis or reverse electrodialysis unit or the electrodeionization module or the flow through capacitor comprises at least one anode, at least one cathode and one or more membranes according to the first or third aspect of the present invention. Further the unit preferably comprises an inlet for providing a flow of water having a relatively high salt content along a first side of a membrane according to the present invention and an inlet for providing a flow of water having a relatively low salt content along a second side of the membrane such that ions pass from the first side to the second side of the membrane. Preferably the one or more membranes of the unit comprise a membrane according to the first or third aspect of the present invention having cationic groups and a further membrane having anionic groups.

In a preferred embodiment the unit comprises at least 3, more preferably at least 5, e.g. 36, 64 or up to 500 or even 1000, membranes according to the first or third aspect of the present invention, the number of membranes being dependent on the application. The membrane may for instance be used in a plate-and-frame or stacked-disk configuration or in a spiral-wound design. Alternatively, a continuous first membrane according to the present invention having cationic groups may be folded in a concertina (or zigzag) manner and a second membrane having cationic groups (i.e. of opposite charge to the first membrane) may be inserted between the folds to form a plurality of channels along which fluid may pass and having alternate anionic and cationic membranes as side walls.

The invention will now be illustrated with non-limiting examples where all parts and percentages are by weight unless specified otherwise.

In the examples the following properties were measured by the methods described below.

General Test Methods

Permselectivity ("PS") was measured by using a static membrane potential measurement. Two cells were separated by the membrane under investigation. Prior to the measurement the membrane was equilibrated in a 0.1M NaCl solution for at least 12 hours. Two streams having different NaCl concentrations were passed through cells on opposite sides of the membranes under investigation. One stream had a concentration of 0.1M NaCl (from Sigma Aldrich, min. 99.5% purity) and the other stream was 0.5 M NaCl. The flow rate of both streams was 0.90 dm³/min. Two Calomel reference electrodes (from Metrohm AG, Switzerland) were connected to Haber-Luggin capillary tubes that were inserted in each cell and were used to measure the potential difference over the membrane. The effective membrane area was 3.14 cm² and the temperature was 21° C.

When a steady state was reached, the membrane potential was measured ($\Delta V_{meas}$).

The permselectivity (a (%)) of the membrane was calculated according the formula:

$\alpha(\%) = \Delta V_{meas}/\Delta V_{theor} * 100\%$.

The theoretical membrane potential ($\Delta V_{theor}$) is the potential for a 100% permselective membrane as calculated using the Nernst equation.

To compensate for day-to-day measurement fluctuations in all a (%) measurements an internal standard was included which was used to normalize the results. The internal standard used was CMX membrane from Tokuyama Soda; its a (%) value was determined to be 98%.

Electrical resistance ("ER") (ohm·cm²) was measured by the method described by Djugolecki et al, J. of Membrane Science, 319 (2008) on page 217-218 with the following modifications:

the auxiliary membranes were CMX and AMX from Tokuyama Soda, Japan;
a Cole Parmermasterflex console drive (77521-47) with easy load II model 77200-62 gear pumps was used for all compartments;
the flowrate of each stream was 475 ml/min controlled by Porter Instrument flowmeters (type 150AV-B250-4RVS) and Cole Parmerflowmeters (type G-30217-90);
the effective area of the membrane was 3.14 cm².

The membrane strength was determined by the following method which measured the amount of membrane which broke off as a result of an ultrasonic treatment. A dry 0.45 µm filter from Millipore was acclimatised to ambient conditions for 1 hour and then weighed accurately (W1). The dry membrane under test (800 cm²) was acclimatised to ambient conditions for 1 hour and then weighed to give $W_{membrane}$, cut into pieces, placed in a beaker containing water (200 cm³) and the beaker was placed in a Branson 8210 ultrasonic bath for 99 minutes. After this treatment the water was decanted off the pieces and filtered through the abovementioned filter. The pieces were carefully rinsed with water at 40° C. to remove any pieces of membrane broken off by the ultrasonic treatment, and the washings were also filtered, taking care to retain intact membrane in the beaker. The filter (including any broken off pieces of membrane) was dried at 30° C. in a vacuum oven overnight and then weighed after acclimatizing it for an hour under the same conditions as the filter had been acclimatized prior to the filtration (W2). The % weight loss (which is inversely proportional to membrane strength) arising from ultrasonic treatment was calculated as follows:

% weight loss=100%×(W2−W1)/$W_{membrane}$

A low weight loss indicates a strong membrane and a high weight loss indicates a weak membrane.

pH measurements were performed using a Metrohm 691 pH meter equipped with a Metrohm 6.0228.000 electrode, calibrated at 20° C. with standard buffers of pH 4 and 7.CD is the calculated crosslink density in mmol/g and IEC is the calculated ion exchange capacity in meq/g (both calculated as described above).

MF is the molar fraction of curable compounds comprising at least two (meth)acrylic groups, relative to the total number of moles of curable compounds present in the composition (calculated as described above), Ingredients CL1—is $N^1,N^6$-Bis(3-acrylamidopropyl)-$N^1,N^1,N^6,N^6$-tetramethylhexane-1,6-diaminium bromide (a curable compound comprising at least two (meth)acrylic groups and a quaternary ammonium group), synthesized as described below, having a molecular weight of 556.4.

CL2—is N,N'-(oxybis(ethane-2,1-diyl))bis(3-acrylamido-N,N-dimethylpropan-1-aminium) bromide (a curable compound comprising at least two (meth)acrylic groups and a quaternary ammonium group), synthesized as described below, having a molecular weight of 544.4.

CL3—is N,N'-(1,4-phenylenebis(methylene))bis(3-acrylamido-N,N-dimethylpropan-1-aminium) bromide (a curable compound comprising at least two (meth)acrylic groups and a quaternary ammonium group), synthesized as described below, having a molecular weight of 576.4.

MBA—is N,N'-methylene bisacrylamide from Sigma Aldrich (a curable compound comprising at least two (meth) acrylic groups and being free from quaternary ammonium groups), having a molecular weight of 154.2.

ATMAC—is 3-acrylamidopropyl-trimethylammonium chloride from Kohjin (a curable compound having one ethylenically unsaturated group), having a molecular weight of 206.7.

IPA—is 2-propanol (a solvent) from Shell.

MEHQ—is hydroquinone mono methyl ether (a polymerization inhibitor).

$LiNO_3$—is lithium nitrate

Darocur™—1173 is a photoinitiator.

Novatexx™—2473 is a nonwoven polypropylene/polyethylene material from Freudenberg Filtration Technologies. The support is chemically treated to lower its surface energy and enhance adhesion.

Synthesis Compound CL1

A solution of N-[3-dimethylamino)propyl]acrylamide (200 mL, 190 g, 1.22 mol) and 1,6-dibromohexane (93.4 mL, 147 g, 0.605 mol, 0.50 eq) in acetonitrile (1.0 L) was stirred under reflux temperature for 1 hour. The solid formed was filtered-off, washed with acetonitrile (2×0.3 L) and transferred to a flask with 4-methoxyphenol (HQME, 75 mg, 0.605 mmol, 1000 ppm) and acetonitrile (300 mL). The solvent was removed in vacuo to give CL1 (353 g) as a hygroscopic white solid.

Synthesis Compound CL2

A solution of 2,2'-dibromoethylether (103.1 g, 0.444.7 mol), N-[3-dimethylamino)propyl]acrylamide (147 mL, 139.0 g, 889.5 mmol, 2.0 eq) and phenothiazine (532 mg, 2.67 mmol, 0.006 eq) in acetonitrile (0.85 L) was stirred mechanically under reflux temperature overnight. A two-layer system was formed. The layers were separated. The lower layer was diluted with water (0.2 L), washed with ethyl acetate (0.2 L) and freeze dried to give CL2 (247 g) as a hygroscopic off-white solid.

Synthesis Compound CL3

A solution of N-[3-dimethylamino)propyl]acrylamide (130.3 g, 0.834 mol) and α,α'-dibromo-p-xylene (110.0 g, 0.417 mol, 0.50 eq) and HQME (52 mg, 0.417 mmol, 1000 ppm) in acetonitrile (1.38 L) was stirred mechanically under reflux temperature over the weekend. The solid formed was filtered off, washed with acetonitrile and transferred to a flask with HQME (52 mg, 0.417 mmol, 1000 ppm) and acetonitrile (300 mL). The solvent was removed in vacuo to give CL3 (260 g) as a hygroscopic white solid.

EXAMPLES 1 TO 10 AND COMPARATIVE EXAMPLES 1 TO 2

Compositions Ex 1 to Ex 10 and comparative compositions CE1 to CE2 were prepared by mixing the ingredients expressed as wt % shown in Tables 1 and 2.

The resultant compositions were applied to an aluminium underground carrier using a 120 μm wire wound bar, at a speed of approximately 5 m/min, by hand, followed by application to a non-woven support (Novatexx™ 2473) levelled using a 4 micrometer wire wound rod coater. The temperature of the compositions was 20-60° C.

A membrane was prepared by curing the coated support using a Light Hammer LH6 from Fusion UV Systems fitted with a D-bulb working at 100% intensity with a speed of 30 m/min (single pass). The exposure time was 0.47 seconds.

After curing, the membrane was stored in a 0.1M NaCl solution for at least 12 hours.

TABLE 1

| Ingredient | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| ATMAC | 18.2 | 7.4 | 0 | 18.5 | 7.6 | 0 | 34.9 | 17.8 | 7.2 | 0 |
| CL1 | 49.2 | 60.0 | 67.5 | 0 | 0 | 0 | 0 | 0 | 0 | 0 |
| CL2 | 0 | 0 | 0 | 48.9 | 59.9 | 67.5 | 0 | 0 | 0 | 0 |
| CL3 | 0 | 0 | 0 | 0 | 0 | 0 | 32.6 | 49.7 | 60.4 | 67.5 |
| Solvent (water) | 32.1 | 32.1 | 32.0 | 32.1 | 32.0 | 32.0 | 32.0 | 32.0 | 31.9 | 32.0 |
| MEHQ | 0.05 | 0.05 | 0.05 | 0.05 | 0.05 | 0.05 | 0.05 | 0.05 | 0.05 | 0.05 |
| Darocur ™ 1173 | 0.45 | 0.45 | 0.45 | 0.45 | 0.45 | 0.45 | 0.45 | 0.45 | 0.45 | 0.45 |
| MF | 0.5 | 0.75 | 1.0 | 0.5 | 0.75 | 1.0 | 0.25 | 0.5 | 0.75 | 1.0 |
| CD (mmol/g) | 1.31 | 1.60 | 1.80 | 1.33 | 1.63 | 1.84 | 0.84 | 1.28 | 1.55 | 1.74 |
| IEC (meq/g) | 3.93 | 3.73 | 3.59 | 4.00 | 3.81 | 3.67 | 4.18 | 3.83 | 3.62 | 3.47 |
| Results | | | | | | | | | | |
| PS (α (%)) | 93.6 | 93.9 | 92.8 | 94.0 | 93.9 | 94.2 | 92.0 | 93.9 | 93.9 | 95.0 |
| ER (ohm · cm$^2$) | 0.7 | 0.9 | 0.9 | 0.9 | 0.8 | 0.7 | 0.8 | 0.9 | 1.1 | 1.2 |
| Membrane % weight loss after ultrasonic treatment | 0.6 | 0.1 | 0.2 | 0.1 | 0.2 | 0.2 | 3.0 | 0.2 | 0.1 | 0.3 |

Note:
The ER is preferably as low as possible, preferably below 1.5 ohm · cm$^2$.

TABLE 2

| Ingredient | CE 1 | CE 2 |
|---|---|---|
| ATMAC | 27.6 | 16.8 |
| MBA | 20.6 | 25.4 |
| Solvent (water) | 21.3 | 20.3 |
| Solvent (IPA) | 8.9 | 11.0 |
| LiNO$_3$ | 21.1 | 26.0 |
| MEHQ | 0.05 | 0.05 |
| Darocur ™ 1173 | 0.45 | 0.45 |
| MF | 0.5 | 0.67 |
| CD (mmol/g) | 2.77 | 3.91 |
| IEC (meq/g) | 2.77 | 1.93 |

TABLE 2-continued

| Ingredient | CE 1 | CE 2 |
|---|---|---|
| Results | | |
| PS (α (%)) | 93.3 | 87.5 |
| ER (ohm · cm$^2$) | 1.6 | 2.0 |
| Membrane % weight loss after ultrasonic treatment | 0.2 | 0.1 |

The invention claimed is:

1. A membrane obtained from curing a composition comprising:
(i) a curable compound comprising (a) at least two acrylamide groups; and (b) at least one quaternary ammonium group;
(ii) solvent;
and optionally (iii) a curable compound having one ethylenically unsaturated group.

2. The membrane according to claim 1 wherein the composition further comprises a radical initiator.

3. The membrane according to claim 1 wherein optional component (iii) is present.

4. The membrane according to claim 1 wherein component (ii) comprises water or a mixture comprising water and a water-miscible organic solvent.

5. The membrane according to claim 1 wherein the curable compound having one ethylenically unsaturated group further comprises a cationic group.

6. The membrane according to claim 1 wherein component (i) comprises a compound of the Formula (1):

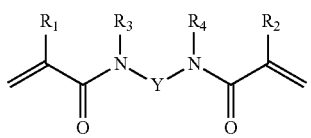

Formula (1)

wherein:
R$_1$ and R$_2$ are H;
R$_3$ and R$_4$ are each independently H or alkyl, or R$_3$ and R$_4$ together with the N atoms to which they are attached and Y form an optionally substituted 6- or 7-membered ring; and
Y is a linking group comprising an optionally substituted and optionally interrupted alkylene or arylene group;
provided that the compound of Formula (1) has at least one of 1, 2, 3 or 4 quaternary ammonium groups, wherein the at least one of 1, 2, 3 or 4 quaternary ammonium groups may be present as substituents and/or interruptions within the Y group or on the 6- or 7-membered ring formed by R$_3$ and R$_4$ together with the N atoms to which they are attached.

7. The membrane according to claim 1 comprising a structural unit of Formula (1'):

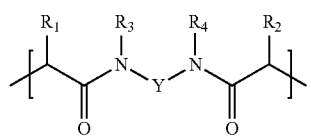

Formula (1')

wherein:
R$_1$ and R$_2$ are H;
R$_3$ and R$_4$ are each independently H or alkyl, or R$_3$ and R$_4$ together with the N atoms to which they are attached and Y form an optionally substituted 6- or 7-membered ring; and
Y is a linking group comprising an optionally substituted and optionally interrupted alkylene or arylene group;
provided that the structural unit of Formula (1') has at least one of 1, 2, 3 or 4 quaternary ammonium groups, wherein the at least one of 1, 2, 3 or 4 quaternary ammonium groups may be present as substituents and/or interruptions within the Y group or on the 6- or 7-membered ring formed by R$_3$ and R$_4$ together with the N atoms to which they are attached.

8. The membrane according to claim 1 wherein the composition further comprises a radical initiator, component (ii) comprises water or a mixture comprising water and a water-miscible organic solvent and optional component (iii) is present and further comprises a cationic group.

9. The membrane according to claim 1 wherein the molar fraction of curable compounds comprising at least two acrylamide groups and a quaternary ammonium group, relative to the total number of moles of curable compounds present in the composition, is at least 0.30.

10. The membrane according to claim 1 wherein the composition comprises:
(i) a curable compound comprising (a) at least two acrylamide groups; and (b) at least one quaternary ammonium group;
(ii) a solvent;
(iii) a curable compound having one ethylenically unsaturated group;
(iv) a curable compound comprising at least two acrylamide groups and being free from quaternary ammonium groups; and
(v) a radical initiator; and
wherein the composition comprises:
(a) 2 to 80 wt % of component (i), 15 to 70 wt % of component (ii), 1 to 70 wt % of component (iii), 0 to 40 wt % of component (iv); and 0 to 10 wt % of component (v); or
(b) 5 to 80 wt % of component (i), 20 to 45 wt % of component (ii), 0 to 60 wt % of component (iii), 0 to 30 wt % of component (iv); and 0.1 to 10 wt % of component (v).

11. An electrodialysis or reverse electrodialysis unit, a flow through capacitor device, an electrodeionization module, a continuous electrodeionization module, a fuel cell, a diffusion dialysis apparatus, a membrane distillation module or a membrane electrode assembly comprising one or more polymeric membranes according to claim 1.

12. An electrodialysis or reverse electrodialysis unit, a flow through capacitor device, an electrodeionization module, a continuous electrodeionization module, a fuel cell, a diffusion dialysis apparatus, a membrane distillation module or a membrane electrode assembly comprising one or more polymeric membranes according to claim 7.

13. A process for preparing a membrane comprising the following steps:
a) applying a composition to a support; and
b) curing the composition to form a membrane;
wherein the composition comprises (i) a curable compound comprising (a) at least two acrylamide groups; and (b) at least one quaternary ammonium group; (ii) solvent; and optionally (iii) a curable compound having one ethylenically unsaturated group; and wherein the curing is performed by radical polymerisation using electromagnetic radiation.

14. The process according to claim 13 wherein the composition comprises:
(i) a curable compound comprising (a) at least two acrylamide groups; and (b) at least one quaternary ammonium group;
(ii) a solvent;
(iii) a curable compound having one ethylenically unsaturated group;
(iv) a curable compound comprising at least two acrylamide groups and being free from quaternary ammonium groups; and
(v) a radical initiator; and
wherein the composition comprises:
(a) 2 to 80 wt % of component (i), 15 to 70 wt % of component (ii), 1 to 70 wt % of component (iii), 0 to 40 wt % of component (iv); and 0 to 10 wt % of component (v); or
(b) 5 to 80 wt % of component (i), 20 to 45 wt % of component (ii), 0 to 60 wt % of component (iii), 0 to 30 wt % of component (iv); and 0.1 to 10 wt % of component (v).

15. The process according to claim 14 wherein the curing is performed using electron beam or UV radiation.

16. The process according to claim 13 wherein the curing is performed using electron beam or UV radiation.

17. The process according to claim 13 wherein the composition is applied continuously to a moving support by means of a manufacturing unit comprising a composition application station, an irradiation source for curing the composition, a membrane collecting station and a means for moving the support from the composition application station to the irradiation source and to the membrane collecting station.

18. The process according to claim 17 wherein the curable composition is applied to the support moving at a speed of over 5 m/min.

* * * * *